United States Patent
Mulloy et al.

(10) Patent No.: US 6,467,270 B2
(45) Date of Patent: Oct. 22, 2002

(54) EXHAUST GAS RECIRCULATION AIR HANDLING SYSTEM FOR AN INTERNAL COMBUSTION ENGINE

(75) Inventors: John Mulloy, Columbus, IN (US); Steve Charlton, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 09/774,239

(22) Filed: Jan. 31, 2001

(65) Prior Publication Data

US 2002/0100279 A1 Aug. 1, 2002

(51) Int. Cl.$^7$ ................................ F02B 33/44
(52) U.S. Cl. .................... 60/605.2; 60/602; 60/603
(58) Field of Search ............................ 60/605.2, 602, 60/603; 123/568.14, 679

(56) References Cited

U.S. PATENT DOCUMENTS

| | | | |
|---|---|---|---|
| 4,196,706 A | 4/1980 | Kohama et al. | 723/119 A |
| 4,217,869 A | 8/1980 | Masaki | |
| 4,276,865 A | 7/1981 | Hamai | |
| 4,474,008 A | 10/1984 | Sakurai et al. | 60/605.2 |
| 4,513,571 A * | 4/1985 | Jenny et al. | 60/605.2 |
| 4,702,218 A | 10/1987 | Yoshioka et al. | 60/605.2 |
| 4,956,973 A | 9/1990 | Fortnagel et al. | 60/605.2 |
| 5,203,311 A | 4/1993 | Hitomi et al. | 60/605.2 |
| 5,309,886 A | 5/1994 | Hitomi et al. | 60/605.2 |
| 5,333,456 A | 8/1994 | Bollinger | 60/605.2 |
| 5,522,697 A | 6/1996 | Parker et al. | 415/158 |
| 5,601,068 A | 2/1997 | Nozaki | |
| 5,611,202 A | 3/1997 | Sumser et al. | 60/605.2 |
| 5,611,203 A | 3/1997 | Henderson et al. | 60/605.2 |
| 5,738,126 A * | 4/1998 | Fausten | 123/569 |
| 5,778,674 A * | 7/1998 | Kimura | 60/605.2 |
| 5,791,146 A * | 8/1998 | Dungner | 60/605.2 |
| 5,794,445 A * | 8/1998 | Dungner | 60/605.2 |
| 6,003,316 A * | 12/1999 | Baert et al. | 60/605.2 |
| 6,085,524 A * | 7/2000 | Persson | 60/602 |
| 6,125,801 A * | 10/2000 | Mendler | 123/568.14 |
| 6,273,076 B1 * | 8/2001 | Beck et al. | 123/679 |

* cited by examiner

*Primary Examiner*—Thomas Denion
*Assistant Examiner*—Thai-Ba Trieu
(74) *Attorney, Agent, or Firm*—Nixon Peabody LLP; Charles M. Leedom; Tim L. Brackett

(57) ABSTRACT

A variable geometry turbine and active wastegate are provided in combination along with independent control of the variable geometry turbine and wastegate valve so as to independently control exhaust gas recirculation flow and air flow in an internal combustion engine. Such independent control of exhaust gas recirculation flow and air flow in an internal combustion engine is achieved by providing a system for exhaust gas recirculation including an intake air manifold, an exhaust manifold, an exhaust gas recirculation passage providing fluid communication between the exhaust manifold and the intake air manifold, a variable geometry turbine positioned downstream of the exhaust manifold, and a waste gate passage providing fluid communication between the exhaust gas manifold and a point downstream of the variable geometry turbine. A control system is provided for controlling exhaust gas recirculation through the exhaust gas recirculation passage by independently controlling a geometry of the variable geometry turbine and thus the casing size of the turbine to control air flow and passage of exhaust gas through a waste gate passage in order to control compressor power which delivers the pressure ratio to the compressor and intake manifold. In doing so, both flow and power are independently controlled in order to maximize efficiency of the system.

9 Claims, 3 Drawing Sheets

EXHAUST GAS RECIRCULATION AIR HANDLING SYSTEM FOR AN INTERNAL COMBUSTION ENGINE

TECHNICAL FIELD

The present invention relates to an exhaust gas recirculation system (EGR system) for internal combustion engines. More specifically, the present invention is directed to EGR systems of the type which recirculate at least a portion of the engine exhaust gases into the engine air intake system for the purpose of reducing $NO_x$ emissions.

BACKGROUND OF THE INVENTION

With continued tightening of governmental regulations on vehicle exhaust emissions, particularly $NO_x$ emissions, not only has the need to recirculate exhaust gases back into the engine intake become apparent, but so has the need to improve upon existing exhaust gas recirculation technology.

U.S. Pat. No. 4,217,869 issued to Masaki discloses an exhaust gas recirculation system in which combustion gases are forced from a reaction chamber through an outlet port into an intake passageway by either an ejector effect or suction produced by the engine exhaust gases drawn from an outlet portion of an EGR passageway. However, such a system when used on engines having efficient turbo machinery and/or an EGR cooler, especially on medium to heavy-duty diesel engines, face the problem that an exhaust-to-intake pressure differential can occur that is either too low or too high thus resulting in an inefficiency in the exhaust gas recirculation. This is particularly the case at rated speed and high loads where the EGR rates near 20% may be required, necessitating EGR flow rates beyond that which simple venturi or ejector aided induction systems can supply.

Future automotive medium-duty and heavy-duty engines will require cooled, recirculated exhaust gases in order to comply with the $NO_x$ emissions standards which at the present time are projected at 2 grams per BHP-/hr. Present engines are generally not capable of exhaust gas recirculation delivery because of their highly efficient turbochargers which develop a positive pressure difference. That is, the intake pressure exceeds exhaust pressure over much of the engine operating range. Various measures to provide exhaust gas recirculation have been investigated including compounding, waste gates, as well as variable geometry turbochargers. However, significant shortcomings are associated with each of these alternatives individually.

While compounding is an effective means of developing a negative pressure differential with which to drive the exhaust gas recirculation system, it has significant drawbacks. Most notably are the complexity of the system which leads to difficulties in packaging the system and consequently results in a significant increase in the overall manufacture and cost of the engine.

The deficiencies of pressure differential type EGR induction systems have been recognized for some time. In U.S. Pat. No. 4,196,706 issued to Kohama et al., control valves are used to regulate the quantity of exhaust gas that is recirculated, and in recognition of the fact that insufficient EGR pressure may exist under certain operating conditions, U.S. Pat. No. 4,276,865 issued Hamai teaches the use of an engine driven pump upstream of the EGR control valve for ensuring that sufficient pressure exists to introduce the EGR gases into the engine intake passageway. However, the use of an engine driven pump adds to the cost and weight of the EGR system, and is thus a source of parasitic losses.

In an effort to overcome the aforementioned shortcomings, a system developed by the assignee of the subject application, Cummins Engine Company, Inc., set forth in U.S. Pat. No. 5,611,203 issued to Henderson et al. discloses an ejector pump enhanced high pressure EGR system. This system utilizes an ejector which is provided with mixer lobes and a defuser which enhances the momentum transfer from the intake flow to the exhaust flow to introduce the EGR exhaust gas flow into the intake passageway. In this manner, the static pressure of the exhaust flow at the entrance of the mixing region is decreased, thereby increasing the differential pressure across the EGR tube and increasing the exhaust flow. As an alternative, the ejector in the EGR tube may be connected to the vehicle air system compressor or turbo compressor which serves to pump the exhaust gases to the engine intake passageway. In either case, such a system requires the use of high pressure air in order to efficiently operate the exhaust gas recirculation system.

Accordingly, there is a need for an exhaust gas recirculation system which provides high engine efficiency when used in connection with non-compound turbo charged engine systems such as non-compound medium-duty and heavy-duty engines which accumulate high annual mileage.

SUMMARY OF THE INVENTION

A primary object of the present invention is to overcome the aforementioned shortcomings associated with prior exhaust gas recirculation systems.

A further object of the present invention is to provide an exhaust gas recirculation system utilizing in combination a variable geometry turbine and wastegate to allow the scheduling of both air flow and exhaust gas recirculation flow rates at any speed and load.

The system set forth in accordance with the present invention allows minimum air flow and accurate control of air flow and exhaust gas recirculation flow.

A further object of the present invention is to provide a system which minimizes the air flow which equates to a minimization of exhaust gas recirculation flow.

A still further object of the present invention is to minimize the exhaust gas recirculation flow so as to minimize the exhaust gas recirculation cooler size thus reducing cost and heat rejection.

A still further object of the present invention is to provide an exhaust gas recirculation-air handling system which minimizes the negative pressure differential across the engine necessary to drive the exhaust gas recirculation system thus resulting in better fuel economy.

A still further object of the present invention is to provide an exhaust gas recirculation system wherein fuel economy is increased by eliminating the need to throttle the engine during operation.

Yet another object of the present invention is to provide an exhaust gas recirculation system wherein the air flow rate and exhaust gas recirculation rate are controlled independently of one another to ensure maximum efficiency at various engine operating conditions and environmental conditions.

These, as well as additional objects of the present invention are achieved by providing in combination a variable geometry turbine and active wastegate while further providing independent control of the variable geometry turbine and wastegate valve so as to independently control exhaust gas recirculation flow and air flow in an internal combustion engine. Such independent control of exhaust gas recirculation flow and air flow in an internal combustion engine is achieved by providing a system for exhaust gas recirculation including an intake air manifold, an exhaust manifold, an exhaust gas recirculation passage providing fluid communication between the exhaust manifold and the intake air manifold, a variable geometry turbine positioned downstream of the exhaust manifold, and a waste gate passage providing fluid communication between the exhaust gas manifold and a point downstream of the variable geometry turbine. A control system is provided for controlling exhaust gas recirculation through the exhaust gas recirculation passage by independently controlling a geometry of the variable geometry turbine and thus the casing size of the turbine to control air flow and passage of exhaust gas through a waste gate passage in order to control compressor power which delivers the pressure ratio to the compressor and intake manifold. In doing so, both flow and power are independently controlled in order to maximize efficiency of the system.

These, as well as additional objects of the present invention, will become apparent from the following detailed description when read in light of the several figures.

DETAILED DESCRIPTION OF THE INVENTION

Figure 1:
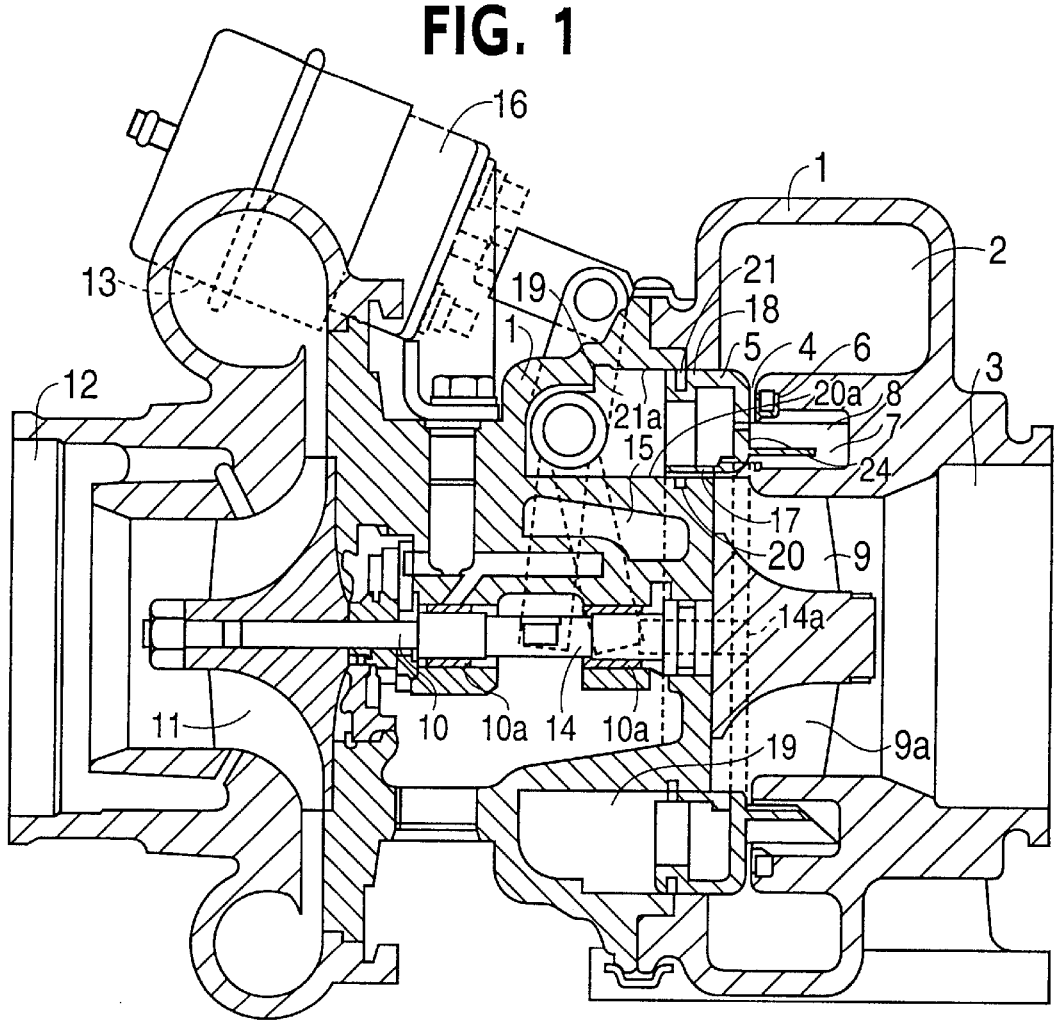
FIG. 1, is an axial cross-sectional view of a variable geometry turbine which may be utilized in accordance with the present invention.

The present invention will now be described in greater detail hereinbelow with reference to the several Figures. Like reference numerals will be utilized in designating like components throughout the specification.

Initially, with reference to FIG. 1, a variable geometry turbine which may be utilized in connection with the above-identified application is illustrated. Such a load-reducing variable geometry turbine is similar to that set forth in U.S. Pat. No. 5,522,697 issued to Parker et al. and assigned to Holset Engineering Company, the contents of which are hereby incorporated herein by reference.

The variable geometry turbine comprises a turbine housing 1 defining a volute or inlet chamber 2 to which exhaust gas from an internal combustion engine is delivered. The exhaust gas flows from the inlet chamber 2 to an outlet passageway 3 by way of an annular radially directed inlet passageway 4 defined on one side by the end face 5a of the movable annular wall member 5 and on the opposite side by a radially extending annular shroud 6 in the form of a plate which covers the opening of an annular recess 7 defined by the facing wall of the housing 1. Although a specific means for fixing shroud 6 in place over recess 7 is not illustrated, it should be apparent to those skilled in the art that a number of different approaches can be used. An example of such would be welding.

The movable annular wall member 5 supports an array of circumferentially spaced veins 8 each of which extends across the inlet passageway, through a suitably configured slot 8a in the shroud 6 and into the recess 7. The veins 8 are oriented away from a radial plane and somewhat tangential thereto so as to properly guide exhaust gas flow to the centripetal turbine veins 9a.

Gas flowing from the inlet chamber 2 to the outlet passageway 3 passes over the plurality of veins 9a of a centripetal turbine wheel 9 and as a result torque is applied to a turbocharger shaft 10 journal by means of bearings 10a which drives a centrifugal compressor wheel 11. In known manner, the compressor wheel 11 pressurizes ambient air present in an air inlet 12 and delivers the pressurized air to an air outlet 13 from which it is fed to an intake manifold of the internal combustion engine. The rpm of the turbine wheel 9 is dependent upon the velocity of the gas passing through the annular inlet passageway 4. For a fixed rate of flow of gas, the gas velocity is a function of the width of the inlet passageway 4, which can be adjusted by controlling the axial position of the movable wall member 5.

Figure 2:
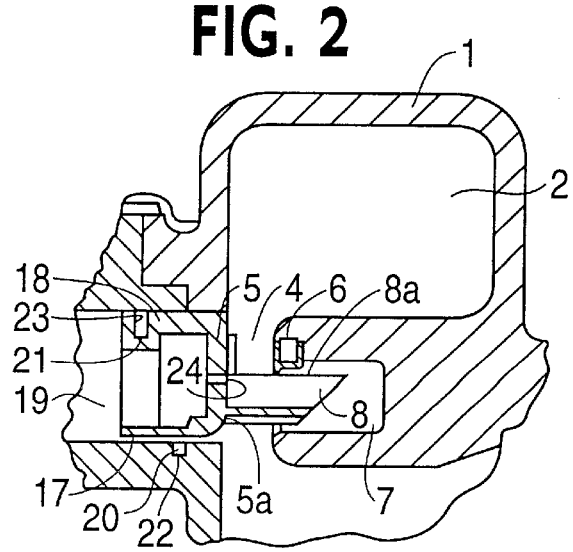
FIG. 2 is an enlarged cross-sectional view of the portion A of FIG. 1.

With reference to FIG. 1, the annular inlet passageway is closed down to a minimum width whereas in FIG. 2, the inlet passageway is shown substantially open. As the width of the inlet passageway 4 is reduced the velocity of the gas passing therethrough increases.

Movement of the annular wall member 5 may be controlled by a suitable actuation means. In the illustrated example, the movable wall member 5 is mounted on the ends 14a of actually extending pins 14, the position of which is controlled by a stirrup member 15 which is linked to a pneumatically operated actuator 16. This actuator can ultimately be controlled by an electronic control module as discussed in greater detail hereinbelow.

The movable wall member 5 has axially extending inner and outer annular flanges 17 and 18, respectively, which extend into an annular cavity 19 provided in the turbine housing 1. Inner and outer sealing rings 20 and 21, respectively, are provided to seal the wall member 5 with respect to inner and outer annular surfaces 20a, 21a of the annular cavity 19 while allowing the annular wall member 5 to slide within the annular cavity 19. The inner sealing ring 20 is supported within an annular groove 22 formed in the inner surface 20a of the cavity and bears against the inner annular flange 17 of the wall member 5, whereas the outer sealing ring 21 is supported within an annular groove 23 provided within the annular flange 18 of the wall member 5 and bears against the radially outermost internal surface 21a of the cavity 19. The wall member 5 is further provided with a number of apertures 24 disposed between adjacent pairs of veins 8 by means of which the face of the wall member 5 which defines one wall of the annular inlet passage 4 is in fluid communication with the cavity 19 which is otherwise sealed off from the inlet passageway 5 by the sealing rings 20 and 21.

When in use in connection with the preferred embodiment of the present invention, with exhaust gas passing through the inlet passageway 4, static pressure will be applied to the face of the inner wall member 5 tending to force the annular wall member 5 into the cavity 19. The previously-mentioned pressure gradient that exists in the turbine inlet passageway is at maximum at the radially outermost section and at a minimum at the radially innermost section of any given position of the annular wall member 5. The effect of this pressure must be overcome by the actuating mechanism if the position of the wall member 5 is to be accurately controlled. Moving the wall member 5 closer to the facing wall 6 of the housing so as to further reduce the width of the annular passageway 4 and increase the speed of the air flowing through the annular inlet passageway 4, tends to increase the load applied to the face of the wall member 5. The apertures 24 are positioned at a radial position between the inner and outer flanges 17 and 18 to communicate to the cavity 19 the optimum pressure for minimizing the force required from the actuator system for an annular wall member 5. The provision of the apertures 24 through the wall member 5 insures that the pressure in the cavity 19 is equal to the static pressure applied to the face of the wall member 5 at the location of the apertures 24, and thus by appropriate positioning of the apertures 24, the resulting load on the wall member may be significantly reduced. The load-reducing effect of the apertures 24 will depend upon their size and number and exact location and may be varied for different applications and where the turbines have different characteristics.

While the foregoing is a detailed discussion of a load-reducing variable geometry turbine, any known variable geometry turbine may be utilized in connection with the present invention. With this in mind, the application of the variable geometry turbine to the present invention will now be discussed in greater detail hereinbelow.

As is noted hereinabove, medium-duty and heavy-duty internal combustion engines require cooled recirculated exhaust gas in order to comply with present $NO_x$ emission standards. Moreover, such medium-duty and heavy-duty engines require more efficient EGR systems in order to meet or exceed the projected 2 grams per BHP per hour threshold which is projected. Medium-duty to heavy-duty engines today are generally not capable of realizing the benefits from EGR systems because of their highly efficient turbochargers which develop a positive pressure difference (intake pressure exceeds exhaust pressure) for much of the engine operating range. As will become apparent from the following discussion, it is possible to provide an exhaust gas recirculation system for such medium-duty and heavy-duty engines in order to achieve the rigorous $NO_x$ emission standards without sacrificing efficiency. While previous EGR/air handling systems which rely on the creation of a negative pressure differential across the engine to drive EGR are generally attractive, such system often result in reduced fuel efficiency. The reasons for a reduction in fuel efficiency of such systems is the negative pumping work which must be carried out due to adverse pressure differential, excessive air flow due to reduced turbine swelling capacity needed to create EGR flow, and the need to control EGR flow rate with an EGR valve in the form of a throttle valve which by definition increases the negative pressure differential and consequently the pumping work due to the adverse pressure differential. Accordingly, the following discussion will highlight the exhaust gas recirculation system of the present invention and how such system overcomes such deficiencies.

Figure 3:
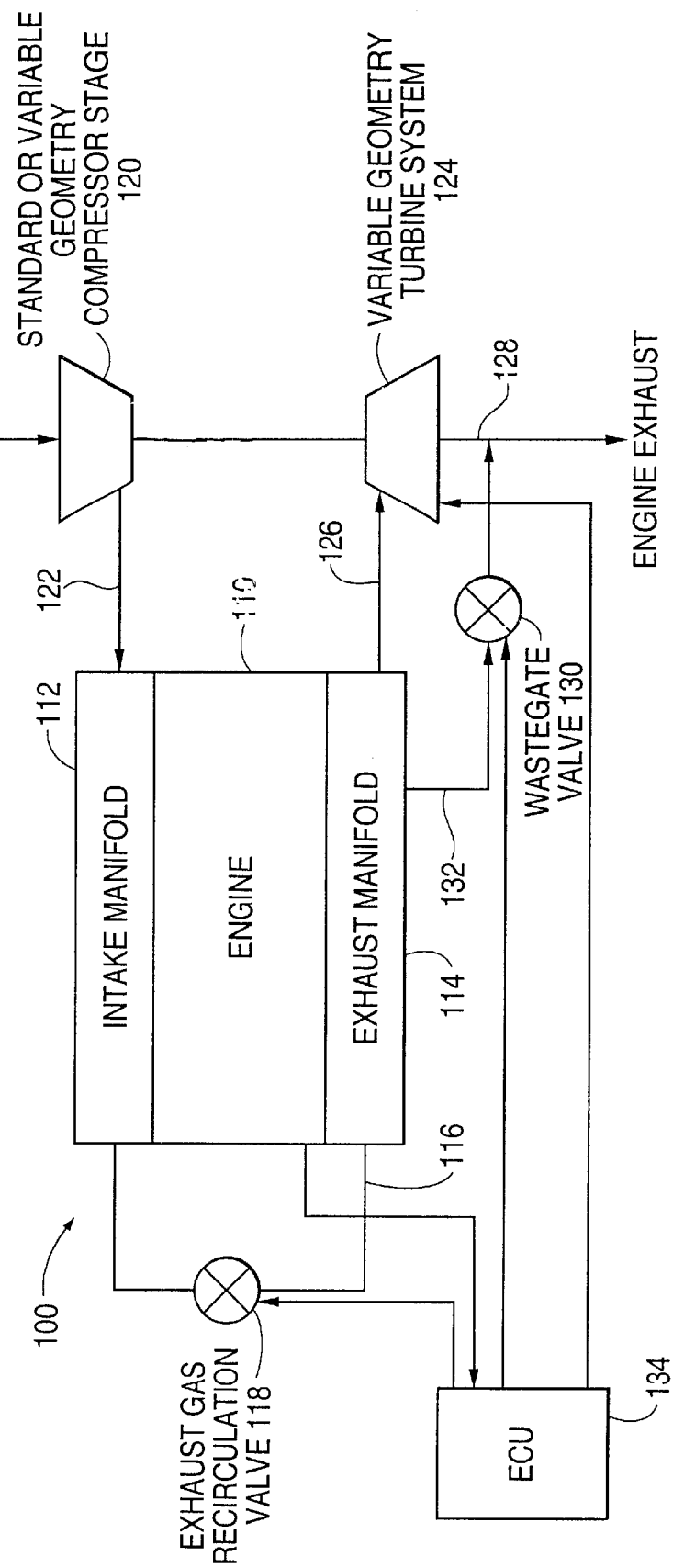
FIG. 3 is a schematic representation of the exhaust gas recirculation system including a variable geometry turbocharger and a modulated wastegate in accordance with the present invention.

With reference now to FIG. 3, the exhaust gas recirculation system 100 in accordance with the present invention is readily adaptable to an internal combustion engine 110 having an intake air manifold 112 and exhaust manifold 114 arranged in a conventional manner. The internal combustion engine 110 may be either a diesel fueled or natural gas fueled internal combustion engine. The system further includes an exhaust gas recirculation passage 116 having an exhaust gas recirculation valve 118 positioned therein.

Further, the intake air manifold receives pressurized air from a standard or variable geometry compressor 124 compressing air and passing such air through passage 122 and into the intake air manifold 112. Additionally, a variable geometry turbine system 124 similar to that discussed hereinabove with respect to FIGS. 1 and 2 is provided for receiving exhaust gas by way of passage 126 to operate the variable geometry turbine system and consequently rotate the compressor of the compressor stage 120. Additionally provided between exhaust gas outlet 128 and the exhaust manifold 114, is a waste gate valve 130 positioned within a waste gate passage 132. As will be discussed in greater detail hereinbelow, the waste gate valve 130 is provided so as to allow communication between the exhaust gas manifold 114, and the downstream side of the variable geometry turbine system. Again, such features will be discussed in greater detail hereinbelow.

The combination of the variable geometry turbine and waste gate allows both EGR flow and air flow to be minimized consistent with meeting emission standards. The system further includes an electronic control unit 134 which receives data in the form of engine load and speed from the internal combustion engine and determines the proper positioning of the waste gate valve 130 and exhaust gas recirculation valve 118, as well as the effective casing size of the variable geometry turbine. In this instance, minimizing the air flow is the key element which allows a reduction in the exhaust gas recirculation flow which advantageously maintains oxygen concentration which in turn minimizes the boost requirement and the heat rejected at the EGR cooler. Accordingly, because control is readily achieved by the variable geometry turbine 124 and waste gate valve 130, the EGR valve 118 may be closed in response to direction from the electronic control unit 134 to close off the EGR system when such system is not required. In this mode, the EGR system can then be designed to produce minimum pressure loss, thereby minimizing the negative pumping work due to adverse pressure differential which was discussed hereinabove as one inherent deficiency in prior art systems.

As in convention exhaust gas recirculation systems, in order to drive exhaust gas recirculation from the exhaust manifold 114 to the intake manifold 112, a situation must be created where the exhaust manifold pressure is higher than the intake manifold pressure. In addition, there must also be developed adequate turbocharger power at the turbine 124 in order to meet the required air flow and intake manifold pressure requirements at the compressor 120. In prior art devices such as a simple fixed geometry turbocharger arrangement, the only way an adequate turbocharger power at the turbine is produced in order to meet required air flow and intake manifold pressure requirements was by reducing the swallowing capacity of the turbine to such an extent that both exhaust to intake pressure drop and compressor power requirements are met. However, in meeting the pressure drop requirement, the air flow requirement is generally exceeded which reduces the fuel efficiency of the engine. Such shortcomings are overcome by providing the combined variable geometry turbine system 124 and waste gate valve 130 in accordance with the present invention which has the ability to allow independent control of both the exhaust gas recirculation flow and air flow without the need to modulate the exhaust gas recirculation valve 118. This valve may be merely in either a fully open or fully closed position, thus eliminating the need to modulate the EGR valve 118.

Figure 4:
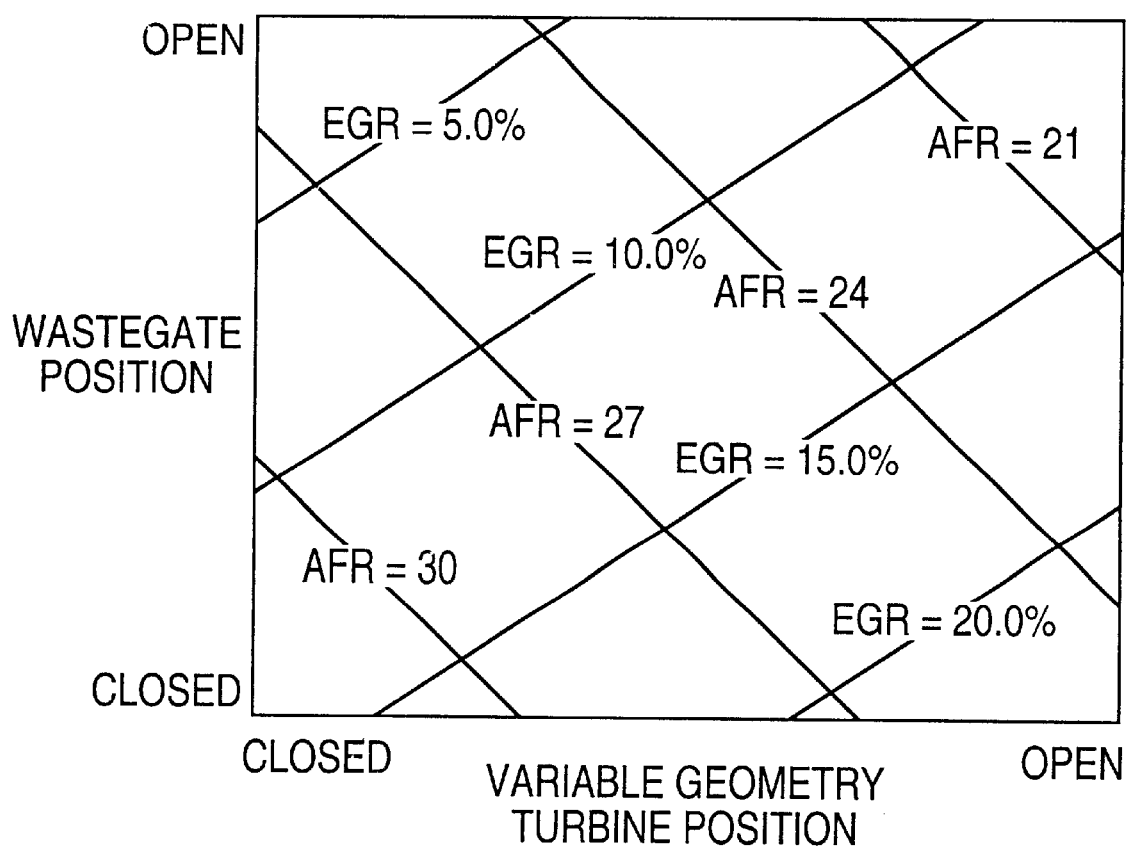
FIG. 4 is a graphic representation of the variation of air/fuel ratio and exhaust gas recirculation rate dependent upon the variable geometry turbine and wastegate positions.

With reference now to the graphic illustration in FIG. 4, it is apparent that the waste gate valve position and variable geometry turbine casing size can be readily controlled between a fully open and fully closed position independently of one another by the electronic control unit 134 in response to engine operating characteristics such as engine load and speed. As can be appreciated from FIG. 4, as the variable geometry turbine approaches its fully closed position or smallest casing size, the air flow rate through the variable geometry turbine is maximized while such air flow rate is minimized as the variable geometry turbine approaches its fully open position or largest casing size. Conversely, as the waste gate valve approaches its fully closed position, the exhaust gas recirculation is at its greatest capacity while as the waste gate valve approaches its fully open position, the exhaust gas recirculation nears its minimum. Accordingly, in response to the above-noted engine parameters, the electronic control unit 134 may readily control the positioning of the waste gate valve 130 and variable geometry turbine 124 so as to provide the requisite air flow rate and exhaust gas recirculation for any given engine operating condition. Again, by permitting independent control of the waste gate valve and variable geometry turbine positions, substantial advantages for medium-duty to heavy-duty engines required to achieve excellent fuel consumption at low $NO_x$ emissions is achieved. That is, in any given engine operating condition the position of the variable geometry turbine and waste gate valve can be scheduled to provide the minimum flow required to meet emission standards which in turn has the advantage of minimizing pumping work, EGR cooler heat rejection, and boost pressure which equates to greater efficiency. Therefore, because the variable geometry turbine 124 and waste gate 130 control the flow through the system, the EGR path can be designed for minimum pressure loss, thus providing further gain and fuel economy versus other systems. Accordingly, providing an exhaust gas recirculation system having a combination of controls which enables the EGR and air flow to be scheduled as a function of engine load and speed, such system eliminates excessive air flow due to reduced turbine swallowing capacity which is needed to create the requisite EGR flow and eliminate the need to control EGR flow rate with an EGR throttle valve which reduces the pumping work due to the adverse pressure differential previously confronted.

Accordingly, the foregoing invention provides an exhaust gas recirculation system wherein the air flow rate and the exhaust gas recirculation rate are controlled independently of one another to insure maximum efficiency at various engine operating conditions and environmental conditions. The combination variable geometry turbine and active waste gate which are independently controlled by a central electronic control unit in response to variable engine operating conditions provides a system which reduces $NO_x$ emissions without requiring the modulation of an exhaust gas recirculation valve.

While the present invention is being described with reference to a preferred embodiment, it will be appreciated by those skilled in the art that the invention may be practiced otherwise than as specifically described herein without departing from the spirit and scope of the invention. It is, therefore, to be understood that the spirit and scope of the invention be limited only by the appended claims.

What is claimed is:

1. A system for exhaust gas recirculation in an internal combustion engine, comprising:

an intake air manifold;

an exhaust manifold;

an exhaust gas recirculation passage providing fluid communication between said exhaust manifold and said intake air manifold;

an exhaust gas recirculation valve positioned in said exhaust gas recirculation passage;

a variable geometry turbine positioned downstream of said exhaust manifold;

a wastegate passage providing fluid communication between said exhaust gas manifold and a point downstream of said variable geometry turbine so as to bypass flow around said variable geometry turbine;

a wastegate valve positioned in said wastegate passage; and a control means for controlling exhaust gas recirculation through said exhaust gas recirculation passage by controlling a geometry of said variable geometry turbine and by controlling said wastegate valve;

wherein said control of said geometry of said variable geometry turbine is independent of said control of said wastegate valve so as to avoid modulation of said exhaust gas recirculation valve.

2. The system as defined in claim 1, wherein said control means controls an opening of said wastegate valve for controlling the passage of exhaust gas through said wastegate passage.

3. The system as defined in claim 2, wherein a position of said wastegate valve is controlled between a fully open and fully closed position by said control means.

4. The system as defined in claim 3, wherein a rate of exhaust gas recirculation to said engine is in a range of 0% to 30% between the fully open and fully closed positions of said wastegate valve.

5. The system as defined in claim 3, wherein an air-fuel ratio supplied to the engine is in a range of 20 to 40 between the fully open and fully closed positions of said wastegate valve.

6. The system as defined in claim 1, further comprising a compressor for compressing intake air passing to said intake air manifold.

7. The system as defined in claim 6, wherein said compressor is a variable geometry compressor.

8. The system as defined in claim 1, wherein a position is controlled such that a rate of exhaust gas recirculation to said engine is in a range of 0% to 30% between the fully closed and fully open position of said wastegate valve.

9. The system as defined in claim 1, wherein an air-fuel ratio supplied to the engine is in a range of 20 to 40 between the fully open and fully closed position of said wastegate valve.

* * * * *